United States Patent
Yuzawa et al.

(10) Patent No.: US 10,759,049 B2
(45) Date of Patent: Sep. 1, 2020

(54) SERVICE PROVIDING SYSTEM, DATABASE, AND SERVICE PROVIDING DEVICE

(71) Applicant: HONDA MOTOR CO., LTD., Minato-ku, Tokyo (JP)

(72) Inventors: Makoto Yuzawa, Wako (JP); Atsushi Nishi, Wako (JP); Miyuki Shimota, Wako (JP); Takaichi Sano, Wako (JP); Seiichi Yamamoto, Tokyo (JP); Keiichi Iguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 15/997,855

(22) Filed: Jun. 5, 2018

(65) Prior Publication Data
US 2018/0354129 A1 Dec. 13, 2018

(30) Foreign Application Priority Data
Jun. 9, 2017 (JP) .................... 2017-114604

(51) Int. Cl.
*B25J 9/16* (2006.01)
*B25J 11/00* (2006.01)

(52) U.S. Cl.
CPC ........... *B25J 9/1661* (2013.01); *B25J 9/1689* (2013.01); *B25J 11/008* (2013.01); *Y10S 901/01* (2013.01)

(58) Field of Classification Search
CPC ..................................... B25J 9/16; B25J 11/00
See application file for complete search history.

(56) References Cited

U.S. PATENT DOCUMENTS

| | | | |
|---|---|---|---|
| 6,622,140 B1 | 9/2003 | Kantrowitz | |
| 8,639,644 B1* | 1/2014 | Hickman | G06N 3/008 700/245 |
| 2007/0022078 A1* | 1/2007 | Gupta | G06N 5/00 706/59 |
| 2009/0254236 A1* | 10/2009 | Peters, II | G05D 1/0221 701/28 |

(Continued)

FOREIGN PATENT DOCUMENTS

| | | |
|---|---|---|
| JP | 2004-514220 | 5/2004 |
| JP | 2004-363956 | 12/2004 |

(Continued)

OTHER PUBLICATIONS

Adam Conner-Simons, "http://news.mit.edu/2016/detecting-emotions-with-wireless-signals-0920" Sep. 20, 2016.

*Primary Examiner* — Kira Nguyen
(74) *Attorney, Agent, or Firm* — Amin, Turocy & Watson, LLP

(57) ABSTRACT

A service providing system is equipped with a robot, a robot time zone management unit configured to specify a time zone in which there is no action plan for the robot itself, an activity specifying unit configured to specify an activity that has yet to be experienced by the robot itself or a subject and that is of high priority, and a location specifying unit configured to specify a location where the activity is performed. In the specified time zone, the robot moves to the specified location, performs the specified activity, and provides information obtained through the activity, to the subject.

9 Claims, 9 Drawing Sheets

(56) References Cited

U.S. PATENT DOCUMENTS

2014/0005847 A1    1/2014  Melen
2017/0120446 A1*  5/2017  Veltrop ................ B25J 11/0005
2018/0261131 A1*  9/2018  Asada ...................... G09B 5/06

FOREIGN PATENT DOCUMENTS

| JP | 5170565 | 8/2010 |
|----|---------|--------|
| JP | 2014-011951 | 1/2014 |
| JP | 2015-026092 | 2/2015 |
| JP | 2015-191355 | 11/2015 |

* cited by examiner

SERVICE PROVIDING SYSTEM, DATABASE, AND SERVICE PROVIDING DEVICE

CROSS-REFERENCE TO RELATED APPLICATION

This application is based upon and claims the benefit of priority from Japanese Patent Application No. 2017-114604 filed on Jun. 9, 2017, the contents of which are incorporated herein by reference.

BACKGROUND OF THE INVENTION

Field of the Invention

The present invention relates to a service providing system, a database, and a service providing device that provide at least information using a robot.

Description of the Related Art

A regional information discovery system disclosed in Japanese Laid-Open Patent Publication No. 2015-191355 addresses the problem of utilizing a mobile body as an information collecting means, resulting in the discovery of information embedded within a region.

In order to solve this problem, Japanese Laid-Open Patent Publication No. 2015-191355 discloses that the mobile body records an in-vehicle image and an in-vehicle voice of the passenger, and using at least one from among a predetermined action, a predetermined utterance, or a predetermined operation of the passenger as a trigger, the in-vehicle image and the in-vehicle voice at that time are recorded as in-vehicle information in association with position information of the mobile body, and an outside-of-vehicle image captured by the mobile body at that time.

The mobile body management server receives and collects the in-vehicle information recorded in the mobile body, analyzes the in-vehicle image and the in-vehicle voice included in the in-vehicle information, correlates the outside-of-vehicle image with the position information of the image capturing location of the outside-of-vehicle image when the passenger makes the predetermined action, the predetermined utterance, or the predetermined operation, and stores it in a region discovery information database. Further, in the in-vehicle information recorded at this time, character information entered by the passenger at that location is included as additional information.

SUMMARY OF THE INVENTION

As discussed above, the regional information discovery system implemented by the mobile body described in Japanese Laid-Open Patent Publication No. 2015-191355 is an information collecting system implemented by a mobile body (automatically driven vehicle), and collects information of the region on the basis of a momentary particular voice or a momentary particular action of the passenger. More specifically, the system described in Japanese Laid-Open Patent Publication No. 2015-191355 is a system for collecting information by a direct instruction made by the passenger.

On the other hand, events are held in which a person instructs a robot to perform various actions (walking, jumping, or the like). The aforementioned actions are performed in all cases by an instruction issued from a person.

In this manner, conventionally, the following matters are not assumed to take place. More specifically, it is not assumed that, without a person directly providing an instruction, information of an activity which has not yet been experienced, and which is an activity of high priority, is obtained by the robot taking actions by itself during a time period when the robot is idle.

Stated otherwise, in Japanese Laid-Open Patent Publication No. 2015-191355 and the conventional art, there is no disclosure concerning voluntary actions and learning utilizing a robot.

The present invention has been devised with the aim of solving the aforementioned problem, and has the object of providing a service providing system and a service providing device in which, without a person directly providing an instruction, information of an activity which has not yet been experienced, and which is an activity of high priority, can be obtained by the robot taking voluntary actions and learning during a time period when the robot is idle, and such information can be presented to the person.

Further, another object of the present invention is to provide a database capable of providing information acquired or learned by the above-described robot to other robots, whereby information can be shared among a plurality of robots.

[1] A service providing system according to a first aspect of the invention includes a robot equipped with at least a sensor, a recognition unit, and a drive device, and a robot management device having at least a computer, and which is configured to manage and control the robot on the basis of at least an instruction from a subject, the robot management device including an idle time specifying unit configured to specify a time zone in which there is no action plan for the robot itself, an activity specifying unit configured to specify an activity that has yet to be experienced by the robot itself or the subject and that is of high priority, and an activity location specifying unit configured to specify a location where the activity is performed, wherein, on the basis of an instruction from the robot management device, in the specified time zone, the robot moves to the specified location, performs the specified activity, and provides information obtained through the activity, to the subject.

In accordance with these features, when an activity is specified, which has yet to be experienced by the robot itself or the subject and which is of high priority, the location where the activity is performed is specified. In addition, in the time zone in which there is no action plan for the robot itself, the robot itself moves to the specified location and performs the specified activity. The robot provides the information obtained through the activity of the robot itself to the subject.

Stated otherwise, by voluntary actions and learning utilizing the robot, without the subject directly providing an instruction, information of an activity which has not yet been experienced, and which is an activity of high priority, can be obtained by the robot taking actions by itself during a time period when the robot is idle, and such information can be presented to the subject.

[2] In the first aspect, there may further be provided a mobile body idle time specifying unit configured to specify an idle time period of a mobile body used for movement of the subject, wherein the robot may move to the specified location using the mobile body in the specified time zone and during the idle time period of the mobile body.

By using the mobile body, the range of movement of the robot is expanded. Moreover, if the mobile body is, for example, an automatically driven vehicle, various sensors provided in the automatically driven vehicle, and various sensors provided in the robot operate in cooperation, and are capable of sharing or complementing the travel information, action plans, etc., during driving, whereby it is possible to reduce the load for collecting information required for automated driving, and the time for collecting such information can be shortened.

[3] In the first aspect, the robot may measure an amount of exercise in the case that the subject performs the activity, and provides information concerning the amount of exercise to the subject.

[4] In the first aspect, the activity performed by the robot may be specified on the basis of a dialog that took place in the past between the robot and the subject.

[5] In the first aspect, the time zone in which there is no action plan for the robot itself may be specified on the basis of at least one of the content of an instruction by the subject, a schedule of the subject, and a lifestyle of the subject learned by the robot.

[6] In the first aspect, there may further be provided a server configured to carry out communications with the robot management device via a network, and a database connected to the server, and configured to store data collected by at least the robot management device.

In accordance with this feature, information obtained through activities of the robot itself can be accumulated in the database via the server, and therefore, there is no need to accumulate such information in the robot management device itself, and the storage capacity of the robot management device can be reduced.

[7] In the first aspect, instead of the robot management device, the server may be equipped with a portion of functions possessed by the robot management device. In accordance with this feature, it is possible to increase the processing speed of the robot management device.

[8] A database according to a second aspect of the invention is applied to the service providing system described above, wherein the database is configured to receive information acquired or learned by the robot, and to provide the information to another robot under a predetermined condition.

In accordance with this feature, by providing the information acquired or learned by the above-described robot to other robots, information can be shared among a plurality of robots. As a result, it becomes unnecessary for the plurality of robots to perform the same actions, and it is possible to easily obtain information of locations which are difficult to access, such as remote islands or overseas locations or the like, thereby enhancing the convenience of the service providing system.

[9] A service providing device according to a third aspect of the invention includes a memory configured to store therein an action plan for the robot itself, an arithmetic device configured to retrieve an idle time zone in which there is no action plan for the robot itself, by using information stored in the memory, an input device configured to receive content of utterance of a subject, an arithmetic device configured to specify an activity for obtaining information desired by the subject, based on the received content of utterance, an arithmetic device configured to access the memory installed in the robot or a storage device installed externally of the robot, to thereby specify a location where the activity is performed, a control device configured to cause the robot to, in the retrieved idle time zone, move to the specified location and perform the specified activity, a sensor configured to collect information obtained by the robot performing the activity, and an output device configured to provide the collected information to the subject through images or audio.

With the above features, it is possible to construct a service in which, by voluntary actions and learning utilizing the robot, things that the subject is normally thinking, and information desired by the subject can be obtained by the robot taking actions on its own, and such information can be presented to the subject.

The content of utterance by the subject includes the content of what the subject speaks, the content of what the subject shows by characters or pictures, characters or images displayed on a display screen of a portable information terminal or the like through operation made by the subject.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

An embodiment of a service providing system, a database, and a service providing device according to the present invention will be described below with reference to FIGS. 1 through 9.

Figure 1:
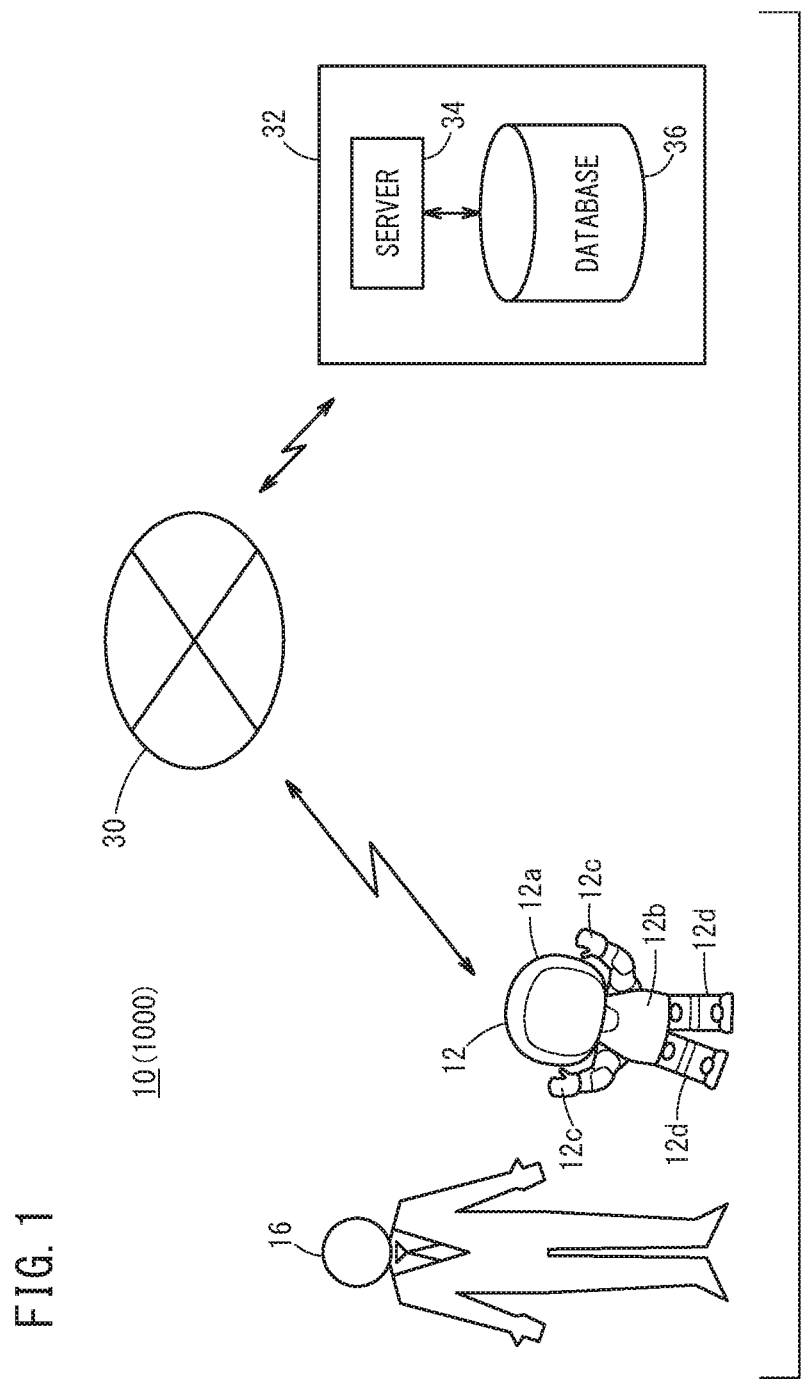
FIG. 1 is an explanatory diagram showing an example of a service providing system (service providing device) according to an embodiment of the present invention.

As shown in FIG. 1, the service providing system 10 (service providing device 1000) according to the present embodiment includes at least one robot 12 which is installed, for example, in one or more homes.

The robot 12 is a humanoid robot having a drive device 300 (see FIG. 2) for a head 12*a*, a torso 12*b*, two arm portions 12c, two leg portions 12d, and the like, and the robot 12 is an autonomous traveling robot which can move by itself. The robot 12 moves the arm portions 12c and the leg portions 12d, for example, according to an action schedule and action plans stored in a memory 14 (see FIG. 2), and performs movements and various operations.

The robot 12 provides assistance to a subject 16 on a daily basis. As examples of the subject 16, there may be cited an owner of the robot 12, a family member of the owner, or the like. As examples of providing assistance, there may be cited, for example, house cleaning, car cleaning, garden cleaning, cooking, dropping off or picking up children, etc. (see, for example, Japanese Patent No. 5170565, Japanese Laid-Open Patent Publication No. 2015-026092, Japanese Laid-Open Patent Publication No. 2014-011951, and Japanese Laid-Open Patent Publication No. 2004-363956).

Figure 2:
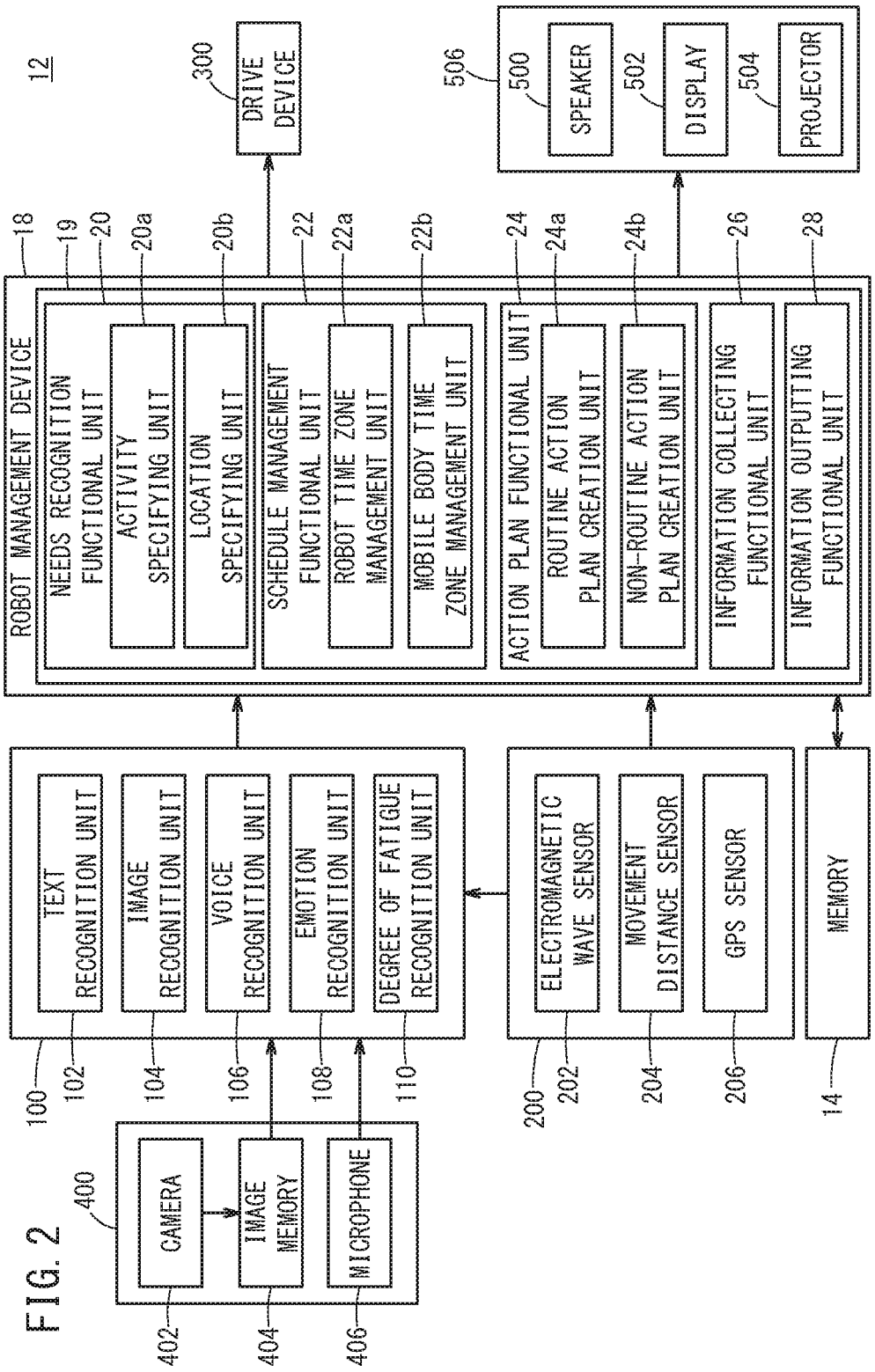
FIG. 2 is a configuration diagram showing an example of a robot in the service providing system (service providing device)

As shown in FIG. 2, the robot 12 is equipped with various recognition units 100, various sensors 200, and various input devices 400. As the recognition units 100, there are included a text recognition unit 102, an image recognition unit 104, a voice recognition unit 106, an emotion recognition unit 108, a degree of fatigue recognition unit 110 that recognizes the degree of fatigue of the subject 16, and the like. As the sensors 200, there are included an electromagnetic wave sensor 202 for recognizing emotions of the subject 16, a movement distance sensor 204 for measuring the distance that the robot 12 moves, a GPS sensor 206 for detecting the current position of the robot 12, and the like. As the input devices 400, there are included a camera 402 that captures images in the surrounding vicinity, an image memory 404 that records the captured surrounding images, and a microphone 406 that collects, for example, ambient sounds.

The text recognition unit 102 recognizes characters in the surrounding vicinity, grasps the content of written documents, and recognizes text data input by the subject 16. For example, the text recognition unit 102 recognizes the surrounding characters from the images recorded in the image memory 404, by using, for example, a pattern matching method or the like. Further, the text recognition unit 102 also grasps the content of written documents, and recognizes text data input by the subject 16, on the basis of the recognized characters, previously incorporated dictionary data, translation software, and the like.

Based on the content recognized by the text recognition unit 102, the emotion recognition unit 108 recognizes the emotions of the subject 16 from documents written, or text data input by the subject 16 (refer, for example, to Japanese Laid-Open Patent Publication No. 2004-514220 (PCT).

The image recognition unit 104 recognizes objects (roads, buildings, automobiles, furniture, people, animals, etc.) in the surrounding vicinity. For example, the image recognition unit 104 recognizes the surrounding objects from the images recorded in the image memory 404, by using, for example, a pattern matching method or the like.

The emotion recognition unit 108 recognizes the emotions of the subject 16, for example, from facial expressions of the subject 16 which are recognized by the image recognition unit 104. On the basis of facial expressions of the subject 16 as recognized by the image recognition unit 104, and a table or the like, in which there are recorded a correspondence relationship between the emotions and previously stored facial expressions, the emotion recognition unit 108 recognizes the emotions of the subject 16.

In addition to recognizing ambient sounds, the voice recognition unit 106 recognizes words uttered by the subject 16. The voice recognition unit 106 recognizes the words that are uttered by the subject 16, for example, on the basis of ambient sounds input through the microphone 406, and previously incorporated dictionary data, translation software, and the like. The emotion recognition unit 108 recognizes the emotions of the subject 16, for example, from sounds (words) uttered by the subject 16 and recognized by the voice recognition unit 106.

Further, the emotion recognition unit 108 recognizes the emotions of the subject 16, for example, on the basis of data detected by the electromagnetic wave sensor 202 (see, http://news.mit.edu/2016/detecting-emotions-with-wireless-signals-0920).

On the basis of the movement distance of the robot 12 measured by the movement distance sensor 204, the degree of fatigue recognition unit 110 detects an amount of exercise exerted in the case that the subject 16 has moved such a distance, converts the detected amount of exercise into calories, and recognizes the degree of fatigue of the subject 16 as a numerical value.

As shown in FIG. 2, the robot 12 includes a robot management device 18 incorporated therein. The robot management device 18 includes a needs recognition functional unit 20 (an activity specifying unit 20a and a location specifying unit 20b), a schedule management functional unit 22, an action plan functional unit 24, an information collecting functional unit 26, and an information outputting functional unit 28.

The robot management device 18 includes a computer 19 constituted by one or a plurality of CPUs (central processing units), and is equipped with various functional units (the above-described needs recognition functional unit 20 and the like) in addition to a non-illustrated main memory. Moreover, according to the present embodiment, the various functional units are software based functional units, in which the various functions thereof are realized by the CPUs executing programs stored in the main memory. However, the various functions thereof can also be realized by hardware based functional units made up from integrated circuits such as FPGAs (Field-Programmable Gate Arrays) or the like.

Further, the robot management device 18 is connected via a network 30 to a cloud type database (hereinafter referred to as the cloud 32). The cloud 32 carries out exchange of data between the robot 12 and a database 36 through the network 30 and a server 34 which is connected to the network 30.

The needs recognition functional unit 20 realizes a function of recognizing what is necessary for enhancing the ability of the robot 12 itself from the standpoint of a need of the subject 16.

For example, from cases of past failure, e.g., the case that the emotional state of the subject 16 changes in a minus direction due to an action of the robot 12 itself, the robot 12 itself specifies information that is missing.

Information desired by the subject 16 is specified from a dialog that took place in the past with the subject 16, for example, from keywords with high frequency, or keywords accompanying emotional changes. Past behavior information (including conversation information) of the subject 16 may be obtained from a mobile terminal, a wearable device, a mobile body or the like of the subject 16, and information desired by the subject 16 may be estimated thereby.

Whether or not the specified information exists in the memory 14 or the cloud 32 is confirmed, and information that is absent or missing is recognized as information that is necessary for "self-development", or more specifically, as information of an activity that has not yet been experienced, and which is an activity of high priority. The activity specifying unit 20a accesses the memory 14 or the cloud 32 to thereby specify an "activity" which is needed in order to obtain the information. The location specifying unit 20b (activity location specifying unit) accesses the memory 14 or the cloud 32 to thereby specify a "location" related to the specified "activity" which is needed in order to obtain the information. If the "activity" and the "location" do not exist in the memory 14 or the cloud 32, a dialog is initiated with the subject 16 or a cloud administrator, whereby the "activity" and the "location" are specified. In addition, the information of the specified "activity" and "location" is stored in the memory 14.

As the "activity" and "location", for example, there may be cited an action that differs from one that occurs ordinarily or on a daily basis for the subject 16, for example, going to a specific golf course and playing golf, or traveling to a specific sightseeing spot with a handicapped person.

The schedule management functional unit 22 includes a robot time zone management unit 22a (idle time specifying unit) and a mobile body time zone management unit 22b (mobile body idle time specifying unit). As the mobile body, there may be cited, for example, an automatically driven vehicle 42 (see FIG. 5) or the like, which is used by the subject 16 and the robot 12.

The robot time zone management unit 22a manages a routine time zone during which normal routine actions (such as providing assistance to the subject 16 on a daily basis) are executed, and a non-routine time zone during which non-routine actions that are not normal routine actions are executed.

The non-routine time zone signifies a time zone, from within the idle time period of the robot 12 itself, in which the robot acts for the purpose of collecting information, based on the "activity" and the "location" specified by the above-described needs recognition functional unit 20. In the case that the robot 12 collects information using a mobile body, such a time zone is specified on the basis of the idle time period of the robot 12, and an idle time period of the mobile body, which is specified by the mobile body time zone management unit 22b.

The idle time period of the robot 12 is specified on the basis of at least an instruction from the subject 16 (for example, a household chore such as cleaning or the like), a schedule of the subject 16 (for example, a schedule recorded in a mobile terminal), and a lifestyle of the subject 16 as learned by the robot 12 (for example, a time of departure or returning home, a time of picking up or dropping off children, ways in which leisure time is spent, or the like). The routine time zone, the non-routine time zone, the idle time period, and the idle time period of the mobile body are stored in the memory 14.

The mobile body time zone management unit 22b manages the time period during which the mobile body is used. For example, based on the schedule of the subject 16, the time zone during which the subject 16 uses the automatically driven vehicle 42 is specified. In accordance with this specification, the idle time period of the mobile body, and in this case, the idle time period of the automatically driven vehicle 42 is also specified. Of course, there may be a plurality of mobile bodies.

The action plan functional unit 24 includes a routine action plan creation unit 24a and a non-routine action plan creation unit 24b.

The routine action plan creation unit 24a creates action plans required for the robot 12 to perform routine actions. For example, operation procedures of the arm portions, the leg portions, or the like, which are necessary for realizing preset daily assistance, are created. The operation procedures related to such routine actions are also stored in the memory 14.

The non-routine action plan creation unit 24b creates an action plan necessary in order to execute a new action, which differs from daily occurrences, and which is executed in the non-routine time zone specified by the schedule management functional unit 22, and more specifically, an action (non-routine action) for the purpose of collecting information on the basis of the "activity" and the "location" specified by the aforementioned needs recognition functional unit 20. As described above, the non-routine action is an action based on the "activity" and "location" specified by the needs recognition functional unit 20, and is indicative of an action that differs from daily occurrences.

Figure 3:
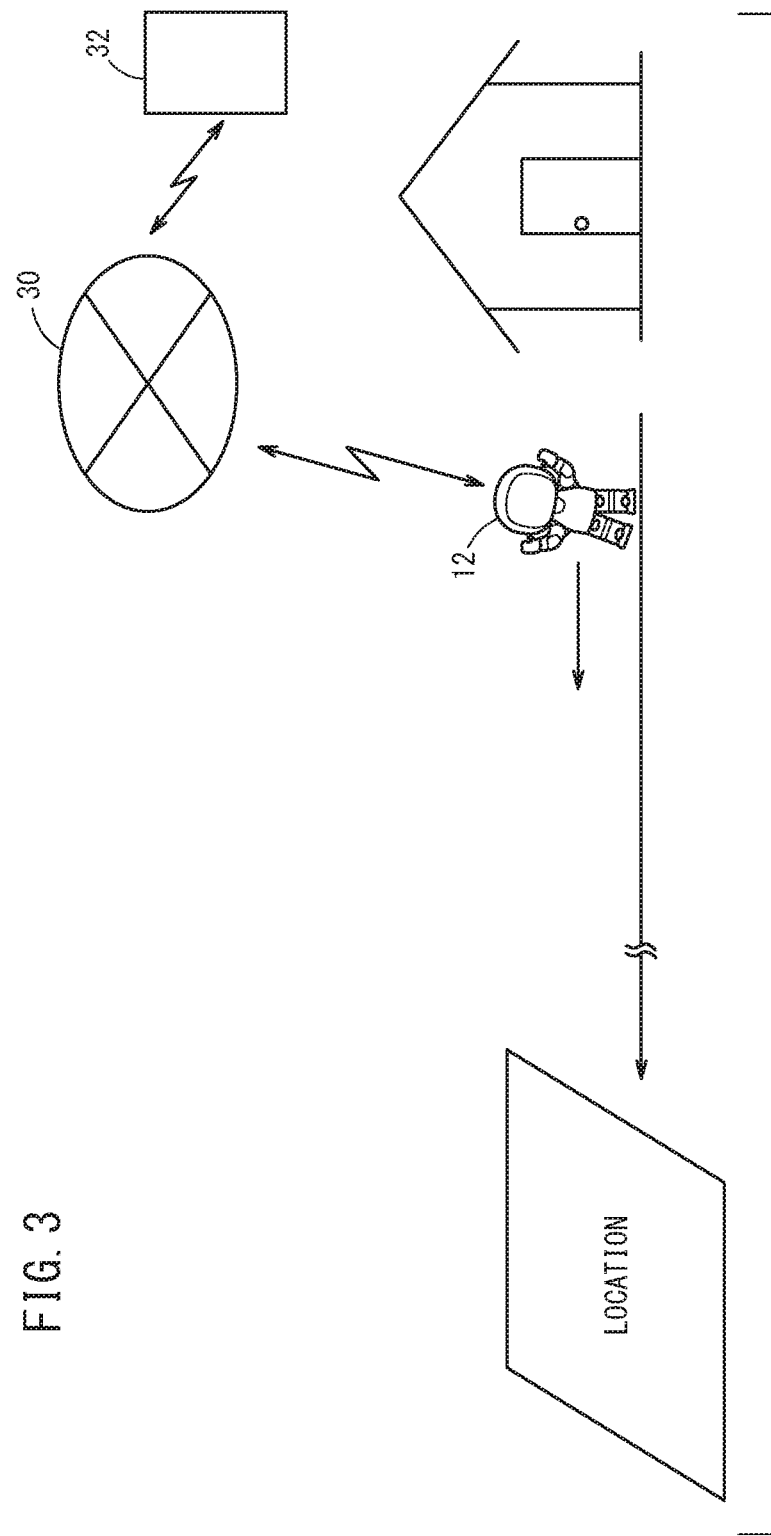
FIG. 3 is an explanatory diagram showing an example of a case in which the robot itself collects information while walking or running.
Figure 4:
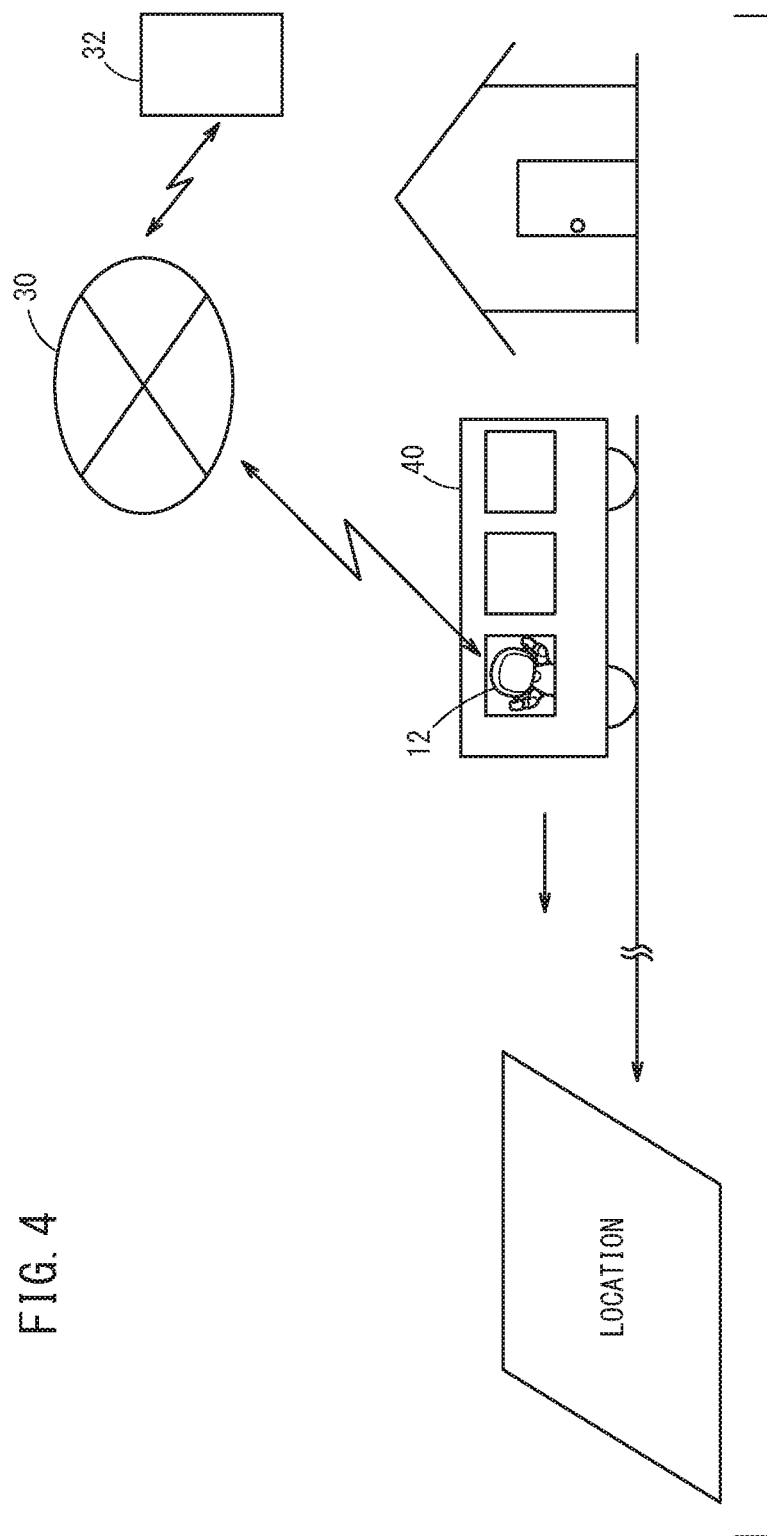
FIG. 4 is an explanatory diagram showing an example of a case in which the robot itself boards a public vehicle (a bus, a train, or the like) and collects information while riding thereon.
Figure 5:
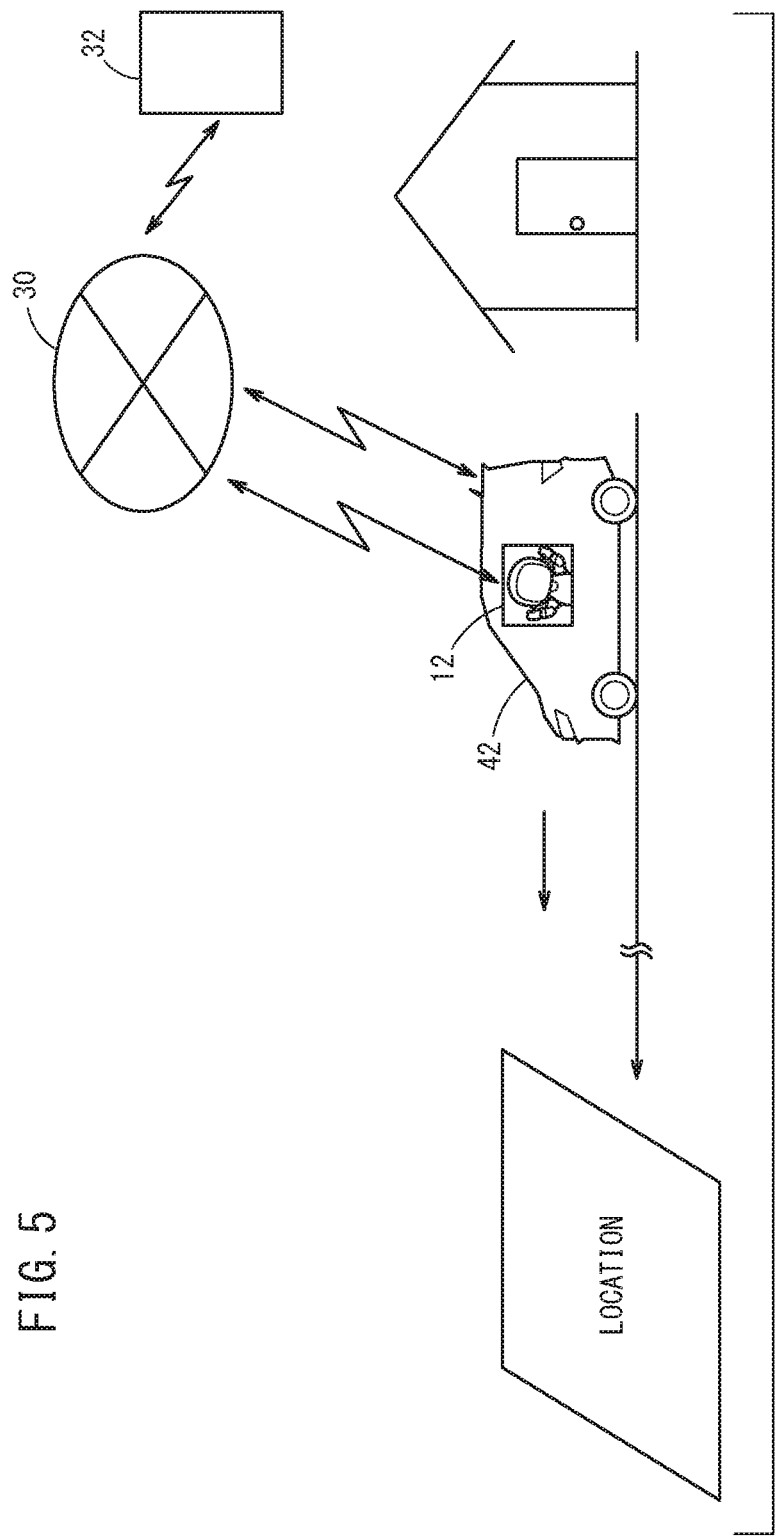
FIG. 5 is an explanatory diagram showing an example of a case in which the robot itself boards an automatically driven vehicle and collects information while riding thereon.
Figure 6:
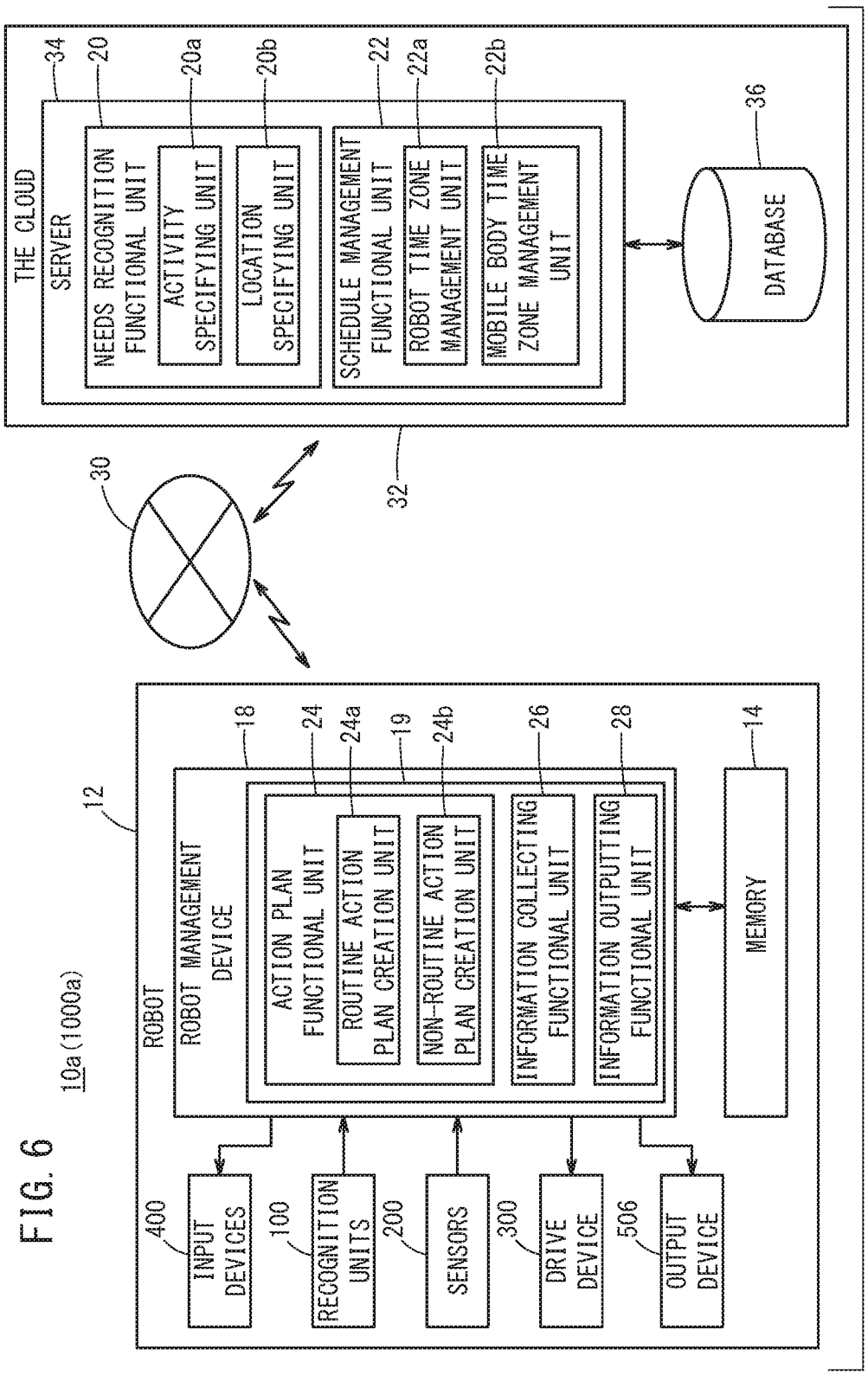
FIG. 6 is a configuration diagram showing another example of the service providing system (service providing device)

Also, in the non-routine action plan creation unit 24b, for example, as shown in FIG. 3, an action plan for a case in which the robot 12 itself walks or runs to go to the specified "location", as shown in FIG. 4, an action plan for a case in which the robot 12 itself boards a public vehicle 40 (a bus, a train, or the like) to go to the specified "location", and as shown in FIG. 5, an action plan for a case in which the robot 12 itself boards the automatically driven vehicle 42 to go to the specified "location" are also created. The operation procedures related to such non-routine actions are also stored in the memory 14.

Moreover, based on the current position of the robot 12 as shown in FIGS. 3 to 5, instructions and corrections of the actions of the robot 12 on the basis of the created action plans are performed by the robot management device 18. Of course, instructions and corrections of the actions of the robot 12 may be transmitted from the cloud 32 to the robot 12 via the network 30, based on information such as the current position of the robot 12 or the like. As shown in FIG. 5, when the automatically driven vehicle 42 is used, the instructions and corrections are also transmitted to the automatically driven vehicle 42 from the robot management device 18 and the cloud 32.

In this instance, upon creating the non-routine action plan, in the case that the time period during which the robot 12 operates in order to execute the non-routine actions does not fit within the non-routine time zone, the non-routine action is divided into a plurality of partial actions, which are executed in order from the highest priority (portions which could not be executed at the present time are performed the next time). Alternatively, the time zone of a routine action of low priority may be modified, and the non-routine time zone may be enlarged so that execution of the non-routine action can be completed therein. In such a case, in order to confirm the priority of the actions to be performed by the robot 12, before execution of the non-routine action, whether to execute the plan that was set up by the robot 12 itself may be confirmed with the subject 16.

The information collecting functional unit 26 obtains traffic conditions for a case in which the subject 16 makes a round trip between the location where the subject 16 is situated and the above-described specified "location", using various sensors provided in the robot 12 corresponding to the five human senses, and calculates the degree of fatigue of the subject 16 assuming a case in which the subject 16 makes such a round trip.

In particular, in the case that the robot 12 performs an action by boarding the automatically driven vehicle 42, the various sensors of the robot 12 cooperate with the various sensors provided in the automatically driven vehicle 42, whereby collection of information may be shared or supplemented therebetween. In addition, the energy (for example, electric power) necessary for activities such as collection of information or the like by the robot 12 may be supplied from the automatically driven vehicle 42 to the robot 12.

In addition to general information, the information to be collected includes specialized information for the subject 16, for example, information conforming to the physical constitution and hobbies or the like of the subject 16. The collected information is stored in the memory 14.

Further, in the case that the specified "activity" is executed at a specified "location", the procedure therefor, and information concerning, for example, in the case of golf play, the sense of distance to the green, the sense of distance to the bunker, and actions that deserve special attention (e.g., how to deal with the ball falling into the bunker, actions regarded as breach of the manners of golf play, or the like) are collected. Further, the degree of fatigue or the like in a case of playing nine holes or eighteen holes of golf is calculated.

If traveling with a handicapped person, information concerning routes to go to a sightseeing spot or barrier-free points at the sightseeing spot, information on positions of points where walking is difficult such as a staircase or the like, and information concerning the arrival and departure of fixed route buses or specialized temporary buses are collected. In addition, the degree of fatigue of the subject 16 due to walking or the like at the sightseeing spot is also calculated.

The information outputting functional unit 28 provides the information collected by the information collecting functional unit 26 to the subject 16 by way of only audio or only images or both of images and audio, etc. For example, to the robot management device 18, an output device 506 having at least one of a speaker 500, a display 502, and a projector 504 is connected. The information outputting functional unit 28 provides the information collected by the information collecting functional unit 26 to the subject 16 by way of images and audio or the like through the output device 506. Of course, in addition to images and audio, the robot 12 may convey the information with a mixture of body and hand gestures.

In providing such information, in the event there are plural pieces of information, priorities may be assigned to the information in advance, and the information may be provided in a descending order of priority. The order of priority may be determined based on, for example, the degree of similarity with preferences of the subject 16. In the case that questions have been asked from the subject 16, information matching with the answers to the questions may be provided, and the order of priority of such information may be rearranged based on the degree of similarity with the questions.

The various information stored in the memory 14 is transmitted to the cloud 32 via the network 30, and is stored in the cloud 32. More specifically, the data (including learned AI) acquired or learned by the robot 12 can be uploaded to the cloud 32. In this case, an incentive (including money) may be granted to the subject 16 (for example, the owner of the robot 12) as a condition for such uploading of data.

If a plurality of robots 12 are connected to the cloud 32 via respective robot management devices 18, it is also possible to download the data acquired or learned by other robots 12. In this case, as a condition for downloading of data, it may be conditioned on the subject 16 (for example, the owner of the robot 12) paying compensation or consideration to the cloud administrator. Such incentives and considerations may be changed in accordance with the value of the information exchanged (the difficulty in obtaining, the novelty, etc., of the data).

By being conditioned in this manner, the cloud administrator can use the difference between the aforementioned income (consideration) and expenditures (incentives) as an operation cost, and an individual cloud-based business can be constructed which utilizes the robots 12 (and the automatically driven vehicle 42).

In the examples discussed above, an example was illustrated in which the needs recognition functional unit 20, the schedule management functional unit 22, the action plan functional unit 24, the information collecting functional unit 26, and the information outputting functional unit 28 are provided in the robot management device 18 that is incorporated in the robot 12. However, the invention is not limited to this feature, and a portion or all of the aforementioned functions may be possessed by the server 34 of the cloud 32. For example, as shown in the service providing system 10a (service providing device 1000a) according to the modified example shown in FIG. 6, the server 34 of the cloud 32 may possess the needs recognition functional unit 20 and the schedule management functional unit 22. Of course, either one of the needs recognition functional unit 20 and the schedule management functional unit 22 may be provided in the server 34. In accordance with this feature, it is possible to increase the processing speed of the robot management device 18, as well as reduce the storage capacity of the memory 14.

Next, process operations of the service providing system 10 according to the present embodiment will be described with reference to the flowchart of FIG. 7.

Figure 7:
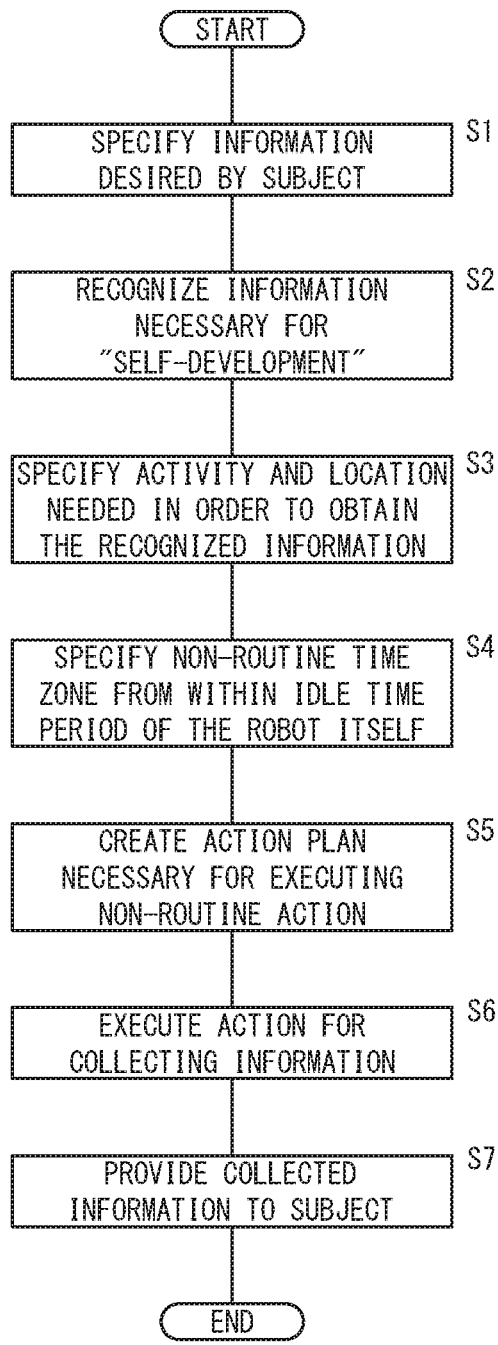
FIG. 7 is a flowchart showing process operations of the service providing system (service providing device)

First, in step S1 of FIG. 7, the needs recognition functional unit 20 specifies information desired by the subject 16 from keywords with high frequency, or keywords accompanying emotional changes, which were acquired, for example, through a dialog that took place in the past between the subject 16 and the robot 12.

In step S2, the needs recognition functional unit 20 confirms whether or not the information specified in step S1 exists in the memory 14 or the cloud 32, and recognizes information that is absent or missing as information necessary for "self-development", or more specifically, as information of an activity that has not yet been experienced, and which is an activity of high priority.

In step S3, the activity specifying unit 20a accesses the memory 14 or the cloud 32 to thereby specify an "activity" needed in order to obtain the recognized information necessary for "self-development", and the location specifying unit 20b accesses the memory 14 or the cloud 32 to thereby specify a "location" related to the specified "activity" which is needed in order to obtain the information. If the "activity" and the "location" do not exist in the memory 14 or the cloud 32, for example, a dialog is initiated with the subject 16 or a cloud administrator, whereby the "activity" and the "location" are specified.

In step S4, from within an idle time period of the robot 12 itself, the schedule management functional unit 22 specifies a non-routine time zone in which an act for the purpose of collecting information on the basis of the "activity" and the "location" specified by the needs recognition functional unit 20 is performed.

In step S5, the non-routine action plan creation unit 24b creates an action plan necessary in order to execute a non-routine action (an action for the purpose of collecting information on the basis of the "activity" and the "location"

specified by the aforementioned needs recognition functional unit 20) which is executed in the non-routine time zone.

In step S6, in accordance with the created action plan, the information collecting functional unit 26 executes an action for collecting information on the basis of the specified "activity" and "location".

In step S7, the information outputting functional unit 28 provides the information collected by the information collecting functional unit 26 to the subject 16, for example, by way of images and audio or the like.

In the foregoing manner, the service providing system 10 according to the present embodiment comprises the robot 12 which acts on the basis of at least an instruction from the subject 16, the robot time zone management unit 22*a* that specifies a time zone in which there is no action plan for the robot 12 itself, the activity specifying unit 20*a* that specifies an activity that has yet to be experienced by the robot 12 itself or the subject 16 and that is of high priority, and the location specifying unit 20*b* that specifies the location where the activity is performed, wherein, in the specified time zone, the robot 12 moves to the specified location, performs the specified activity, and provides information obtained by the activity to the subject 16.

In accordance with these features, when an activity is specified, which has yet to be experienced by the robot 12 itself or the subject 16 and which is of high priority, the location where the activity is performed is specified. In addition, in the time zone in which there is no action plan for the robot 12 itself, the robot 12 itself moves to the specified location and performs the specified activity. The robot 12 provides the information obtained through the activity of the robot 12 itself to the subject 16.

By voluntary actions and learning utilizing the robot 12, without the subject 16 directly providing an instruction, information of an activity which has not yet been experienced, and which is an activity of high priority, can be obtained by the robot 12 taking actions by itself during a time period when the robot 12 is idle, and the information can be presented to the subject 16.

Stated otherwise, it is possible to construct a service in which, by voluntary actions and learning utilizing the robot 12, things that the subject 16 is normally thinking, and information desired by the subject 16 can be obtained by the robot 12 taking actions on its own, and such information can be presented to the subject 16.

In addition, in the present embodiment, there may further be provided the mobile body time zone management unit 22*b* configured to specify an idle time period of a mobile body (for example, the automatically driven vehicle 42) used for movement of the subject 16, wherein the robot 12 moves to the specified location using the mobile body in the specified time zone and during the idle time period of the mobile body.

By using the mobile body, the range of movement of the robot 12 is expanded. Moreover, if the mobile body is, for example, the automatically driven vehicle 42, the various sensors provided in the automatically driven vehicle 42, and the various sensors provided in the robot 12 operate in cooperation, and are capable of sharing or complementing the travel information, action plans, etc., during driving. Consequently, it is possible to reduce the load for collecting information required for automated driving, and the time for collecting such information can be shortened.

Further, in the present embodiment, there are included the robot 12 equipped with at least a sensor, a recognition unit, and a drive device, and the robot management device 18 having at least a computer, and which is configured to manage and control the robot 12 on the basis of at least an instruction from the subject 16, the robot management device 18 including the robot time zone management unit 22*a* configured to specify a time zone in which there is no action plan, the activity specifying unit 20*a* configured to specify an activity that has yet to be experienced by the robot 12 itself or the subject 16 and that is of high priority, and the location specifying unit 20*b* configured to specify the location where the activity is performed, wherein, on the basis of an instruction from the robot management device 18, in the specified time zone, the robot 12 moves to the specified location, performs the specified activity, and provides information obtained through the activity to the subject 16.

Stated otherwise, by voluntary actions and learning utilizing the robot 12, without the subject 16 directly providing an instruction, information of an activity which has not yet been experienced, and which is an activity of high priority, can be obtained by the robot 12 taking actions by itself during a time period when the robot 12 is idle, and the information can be presented to the subject 16.

Further, in the present embodiment, there may further be included the server 34 configured to carry out communications with the robot management device 18 via the network 30, and the database 36 connected to the server 34, and configured to store the data collected by at least the robot management device 18.

In accordance with this feature, information obtained through activities of the robot 12 itself can be accumulated in the database 36 via the server 34, and therefore, there is no need to accumulate such information in the robot management device 18 itself, and the storage capacity of the robot management device 18 can be reduced.

Further, in the present embodiment, instead of the robot management device 18, the server 34 may be equipped with a portion of the functions possessed by the robot management device 18. In accordance with this feature, it is possible to increase the processing speed of the robot management device 18.

Further, the cloud 32 according to the present embodiment is a database which is applied to the service providing system 10*a*, wherein the cloud 32 receives information acquired or learned by the robot 12, and provides the information to another robot under a predetermined condition.

In accordance with this feature, by providing the information acquired or learned by the robot 12 to other robots 12, information can be shared among a plurality of robots 12. As a result, it becomes unnecessary for the plurality of robots to perform the same actions, and it is possible to easily obtain information of locations that are difficult to access, such as remote islands or overseas locations or the like, thereby enhancing the convenience of the service providing system 10*a*.

According to the present embodiment, the service providing device 1000 (1000*a*) includes the memory 14 configured to store therein an action plan for the robot 12 itself, an arithmetic device (the robot management device 18 having the robot time zone management unit 22*a*, or the server 34) configured to retrieve an idle time zone in which there is no action plan for the robot 12 itself, by using information stored in the memory 14, an input device 400 configured to receive content of utterance of the subject 16, an arithmetic device (the robot management device 18 having the activity specifying unit 20*a*, or the server 34) configured to specify an activity for obtaining information desired by the subject 16, based on the received content of utterance, the arithmetic device (the robot management device 18 having the location specifying unit 20b, or the server 34) configured to access the memory 14 installed in the robot 12 or a storage device 36 installed externally of the robot 12, to thereby specify a location where the activity is performed, a control device (the robot management device 18 having the action plan functional unit 24) configured to cause the robot 12 to, in the retrieved idle time zone, move to the specified location and perform the specified activity, a sensor 200 configured to collect information obtained by the robot 12 performing the activity, and an output device 506 configured to provide the collected information to the subject 16 through images or audio.

With the above features, it is possible to construct a service in which, by voluntary actions and learning utilizing the robot 12, things that the subject 16 is normally thinking, and information desired by the subject 16 can be obtained by the robot 12 taking actions on its own, and such information can be presented to the subject 16.

Moreover, it is a matter of course that the present invention is not limited to the above-described embodiment, but can be freely modified within a range that does not depart from the scope of the present invention.

Figure 8A:
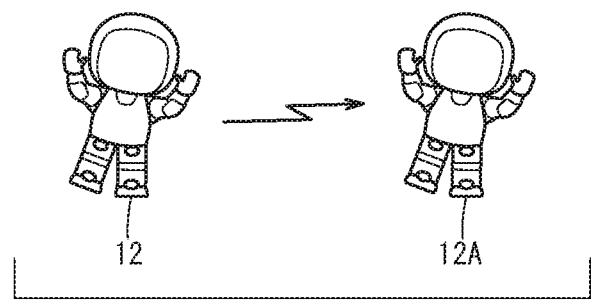
FIG. 8A is an explanatory diagram schematically showing an example in which a robot directly provides data and the like to a nearby robot.
Figure 8B:
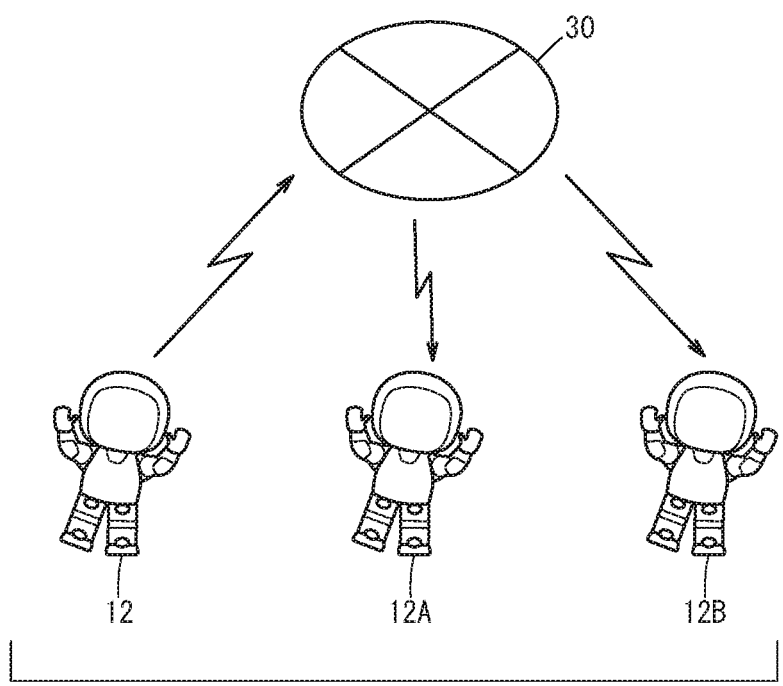
FIG. 8B is an explanatory diagram schematically showing an example in which a robot provides data and the like to one or a plurality of robots via a network.

For example, information of a foreign country may be collected using robots performing activities in such a foreign country, and the information may be reflected, for example, in the robot management device 18 of a robot 12 owned by a subject 16 in his or her home country. For example, an action plan or the like for the purpose of collecting information over the foreign country may be reflected therein. Further, the robot 12 may be made to interact with a celebrity or a prominent figure, the robot 12 may grow or undergo development, and data, learned AI, or the like of the robot 12 that has undergone development may be provided to another robot for a fee. In this case, for example, as shown in FIG. 8A, the robot 12 that has undergone development may directly provide the data, or the learned AI, etc., to a nearby robot 12A, or as shown in FIG. 8B, the robot 12 that has undergone development may provide the data, the learned AI, etc., to one robot 12A or a plurality of robots 12A, 12B, etc., via the network 30.

Figure 9:
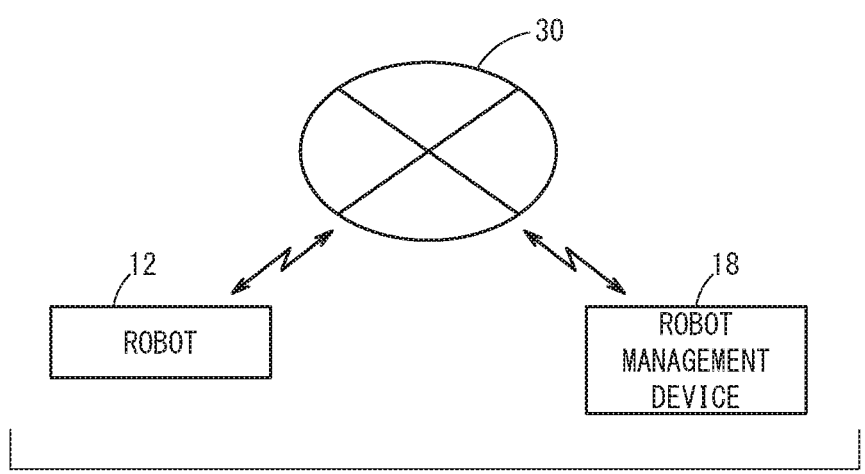
FIG. 9 is a configuration diagram showing an example in which a robot management device is installed externally of a robot.

Further, in the examples discussed above, an example was illustrated in which the robot management device 18 is provided in the robot 12, however, in addition thereto, as shown in FIG. 9, the robot management device 18 may be installed externally of the robot 12, and the robot 12 and the robot management device 18 may communicate with each other via the network 30. In this case, it is possible to increase the signal processing speed of the robot 12. Of course, it is also possible to increase the number and types of the various recognition units and the various sensor units that are mounted on the robot 12.

What is claimed is:

1. A service providing system comprising:
 a robot equipped with at least a sensor, a recognition processor, and a drive device; and
 a robot management device incorporated in the robot, having at least a computer, and which is configured to manage and control the robot, based on at least an instruction from a subject to retrieve requested information, wherein the robot management device comprises:
  an idle time specifying processor configured to specify a time zone in which there is no action plan for the robot itself;
  an activity specifying processor configured to, in response to a determination that requested information is unavailable to the robot, access a memory or a cloud to retrieve an action plan for obtaining the requested information, wherein the action plan comprises a location for obtaining the requested information;
 and
  an activity location specifying processor configured to identify, from the action plan, the location for obtaining the requested information, wherein, based on instructions from the robot management device, in the specified time zone, the robot:
  moves to the location for obtaining the requested information,
  performs actions in accordance with the action plan to obtain the requested information, and
  provides the requested information to the subject.

2. The service providing system according to claim 1, further comprising:
 a mobile body idle time specifying processor configured to specify an idle time period of a mobile body of the robot to be used for movement of the robot to the location for obtaining the requested information during the time zone and during the idle time period of the mobile body.

3. The service providing system according to claim 1, wherein the robot measures an amount of exercise in a case that the subject performs actions in of the action plan, and provides information concerning the amount of exercise to the subject.

4. The service providing system according to claim 1, wherein the action plan is retrieved based on a dialog that between the robot and the subject.

5. The service providing system according to claim 1, wherein the time zone in which there is no action plan for the robot itself is specified, based on at least one of content of the instruction from the subject, a schedule of the subject, and actions of the subject as learned by the robot.

6. The service providing system according to claim 1, further comprising:
 a server configured to carry out communications with the robot management device via a network; and a database connected to the server, and configured to store data collected by at least the robot management device.

7. The service providing system according to claim 6, wherein instead of the robot management device, the server is equipped with a portion of functions possessed by the robot management device.

8. A database applied to a service providing system, wherein the service providing system comprises:
 a robot equipped with at least a sensor, a recognition processor, and a drive device; and
 a robot management device incorporated in the robot, having at least a computer, and which is configured to manage and control the robot, based on at least an instruction from a subject to retrieve requested information, wherein the robot management device comprises:
  an idle time specifying processor configured to specify a time zone in which there is no action plan for the robot itself;
  an activity specifying processor configured to, in response to a determination that requested information is unavailable to the robot, access a memory or a cloud to retrieve an action plan for obtaining the requested information, wherein the action plan comprises a location for obtaining the requested information; and an activity location specifying processor configured to identify, from the action plan, the location for obtaining the requested information, wherein, based on instructions from the robot management device, in the specified time zone, the robot:
  moves to the location for obtaining the requested information,
  performs actions in accordance with the action plan to obtain the requested information, and
  provides the requested information to the subject,
wherein the database is configured to receive information acquired or learned by the robot and to provide the information to another robot under a predetermined condition.

9. A robot comprising:
a memory configured to store therein an action plan for the robot itself;
a time zone device configured to retrieve an idle time zone in which there is no action plan for the robot itself, by using information stored in the memory;
an input device configured to receive an utterance of a subject corresponding to information desired by the subject;
a first arithmetic device configured to access the memory or a cloud to identify an action plan for obtaining the information desired by the subject;
a second arithmetic device configured to access the memory or a storage device installed externally of the robot, to identify a location for performing the action plan;
a control device configured to cause the robot to, in the retrieved idle time zone, move to the location for performing the action plan and perform actions of the action plan;
a sensor configured to collect the information during the performing of the action plan; and
an output device configured to provide the collected information to the subject.

* * * * *